US006189928B1

(12) United States Patent
Sommer et al.

(10) Patent No.: US 6,189,928 B1
(45) Date of Patent: Feb. 20, 2001

(54) VEHICLE OCCUPANT RESTRAINT SYSTEM

(75) Inventors: Karl-Heinz Sommer, Stockdorf; Georg Reichthalhammer, Freutsmoos, both of (DE)

(73) Assignee: TRW Airbag Systems GmbH & Co. KG, Aschau Inn (DE)

( * ) Notice: Under 35 U.S.C. 154(b), the term of this patent shall be extended for 0 days.

(21) Appl. No.: 09/275,064

(22) Filed: Mar. 23, 1999

(30) Foreign Application Priority Data

Mar. 23, 1998 (DE) ............................................ 298 05 217

(51) Int. Cl.[7] ............................ B60R 21/16; B60R 21/18

(52) U.S. Cl. ....................... 280/743.2; 280/735; 280/731; 280/743.1

(58) Field of Search ................................ 280/735, 743.2, 280/743.1, 806, 731

(56) References Cited

U.S. PATENT DOCUMENTS 3,841,654 * 10/1974 Lewis .................................. 280/733
4,615,540 * 10/1986 Sedlmayr et al. ................... 280/806
5,571,253 * 11/1996 Blackburn et al. .................. 280/806
5,871,230 * 2/1999 Lewis .................................. 280/733
5,887,894 * 3/1999 Castagner et al. ................ 280/743.2
5,947,513 * 9/1999 Lehto .................................. 280/733

* cited by examiner

*Primary Examiner*—Lanna Mai
*Assistant Examiner*—Ruth Ilan
(74) *Attorney, Agent, or Firm*—Tarolli, Sundheim, Covell, Tummino & Szabo L.L.P.

(57) ABSTRACT

A vehicle occupant restraint system is provided which includes a gas bag transposable from a space-saving, folded resting condition into a deployed condition. A restraint means is provided which is capable of decelerating at least part of the wall of the gas bag in a controlled manner. The restraint means contains at least one coiling device. At least one catch strap is arranged in the interior of the gas bag and influences the shape of the gas bag in the deployed condition. The catch strap is at least in part accommodated on the restraint means when the gas bag is in the resting condition.

2 Claims, 2 Drawing Sheets

VEHICLE OCCUPANT RESTRAINT SYSTEM

BACKGROUND OF THE INVENTION

A typical vehicle occupant restraint system includes a gas bag transposable from a space-saving, folded resting condition into a deployed condition.

When necessary, the gas bag is transposed by means of an inflator from the folded resting condition into the deployed condition in which it restrains a vehicle occupant as specified. In the deployed condition the shape of the gas bag as well as its position in the vehicle interior relative to the vehicle occupant is usually dictated by the position, number and length of the catch straps arranged in the interior of the gas bag.

Because of the velocity with which the gas bag needs to be deployed so that it attains its optimum position in due time to cushion the vehicle occupant, injuries may occur if the wall of the gas bag during deployment impinges part of the body of the vehicle occupant. This problem is aggravated more particularly when the vehicle occupant happens to be not in his usual position at the point in time of activation of the gas bag, it being in this usual position that he has a predetermined minimum spacing away from the gas bag. Namely, the closer the vehicle occupant is located to the folded gas bag, the greater the likelihood of being hit by wall parts of the gas bag before the gas bag has attained its fully deployed condition, and the greater the energy of the wall parts with which the vehicle occupant comes into contact. Another problem in this respect is that one and the same gas bag needs to restrain vehicle occupants differing in constitution, i.e. to reliably restrain, for example, a heavy male vehicle occupant the gas bag needs to be designed substantially more voluminous than in the case of restraining for example a lighter female vehicle occupant. Accordingly, it is sometimes the case that the gas bag is deployed with unnecessarily high energy which increases the risk of injury.

The object of the invention is to provide a vehicle occupant restraint system including a gas bag posing as small a risk of injury as possible even in the case of an unfavorable vehicle occupant constitution or seating position.

BRIEF SUMMARY OF THE INVENTION

For this purpose, the invention provides a vehicle occupant restraint system including a gas bag transposable from a space-saving, folded resting condition into a deployed condition. A restraint means is provided which is capable of decelerating at least part of the wall of the gas bag in a controlled manner. The restraint means contains at least one coiling device. At least one catch strap is arranged in the interior of the gas bag and influences the shape of the gas bag in the deployed condition. The catch strap is at least in part accommodated on the restraint means when the gas bag is in the resting condition. The catch strap decisively influences by its length the shape of the gas bag in the deployed condition, i.e. the longer the catch strap the further the gas bag is able to deploy in the direction of the vehicle occupant. By adapting the length of the catch strap to the respective situation during deployment of the gas bag, it can be prevented that wall parts of the gas bag impinge parts of the body of the vehicle occupant with high energy, in other words severely hit the vehicle occupant. This adaptations is achieved by means of the coiling device which allows to adapt the length of the catch strap available during deployment in a simple manner to the requirements in each case by withdrawal of the catch strap from the coiling device being halted at an earlier or later point in time. Thereby, the part of the wall of the gas bag facing the vehicle occupant is unable to move toward the vehicle occupant without its velocity being decelerated, especially towards the end of the deployment, so that the risk of injury posed by the wall is minimized. Deceleration in a controlled manner, as provided by the restraint means, is here understood to be a deceleration as a function of parameters which are predeterminable by design.

In accordance with another preferred embodiment it may be provided for the coiling device comprises a braking mechanism capable of producing a deceleration of the catch strap and thus of the wall of the gas bag controlled in travel and time, following a specific deployment of the gas bag, up to standstill. This can be achieved simply by sensing either the length of the catch strap withdrawn from the coiling device or the time taken for withdrawing the catch strap and commencing deceleration as of a specific point in time. As a result of this, the wall of the gas bag is decelerated towards the end of the deployment action when there is an added risk of the vehicle occupant being hit, so that any impact occurs with diminished kinetic energy of the wall.

As an alternative, in accordance with the preferred embodiment, it may be provided for that the restraint means contains a sensor and the coiling device comprises a blocking mechanism which, controlled by an external signal of the sensor, causes deceleration of the wall up to standstill by means of the catch strap. The signal generated by the sensor then limits the length of the catch strap to a value at which the forward movement of the wall parts of the gas bag in the direction of the vehicle occupant is terminated in due time so that impingement of the wall parts of the gas bag with parts of the body of the vehicle occupant is either completely avoided or occurs at least at a significantly diminished velocity.

In this aspect it may be provided for that the sensor is capable of sensing the diving action of parts of the body of the vehicle occupant to be restrained into the gas bag, and of generating a signal thereupon. A sensor in this context is understood to be a sensing device, an analyzing device and a device for outputting a signal as a function of the actions sensed by the sensing device and analyzed by the analyzing device. By means of the sensor the deployment action can be adapted optimally to the respective situation. If, for instance, the sensor senses that the vehicle occupant is seated very near to the deployed gas bag or that a contact has already occurred between the wall of the gas bag and the vehicle occupant, the sensor is caused to output a signal which prevents any further increase in the length of the catch strap. In this way it is assured that the gas bag does not further deploy toward the vehicle occupant.

The sensor may comprise a contact surface area on the outer surface area of the gas bag facing the vehicle occupant to be restrained. The contact surface area forms in this case the sensing device by means of which on first contact between the wall of the gas bag and the vehicle occupant to be restrained the signal can be generated, whereupon a further increase in length of the catch strap is prevented. Thus, it is avoided that the gas bag deploys further toward the vehicle occupant. This reduces the energy with which the wall of the gas bag hits parts of the body of the vehicle occupant.

It may also be provided for that the sensor senses an approach of the gas bag outer surface area facing the vehicle occupant to be restrained and generates the signal before the outer surface area attains the vehicle occupant. In this way the deployment of the gas bag in the direction of the vehicle occupant is limited before vehicle occupant body parts are hit by the wall of the gas bag.

As an alternative it may also be provided for that the sensor contains a position sensor which senses the position of a vehicle occupant. Such a position sensor serving as the sensing device may contain an ultrasonic transceiver furnishing specific information as to the seating position of the vehicle occupant, on the basis of which it can be defined up to which size or in which shape the gas bag is preferably to be deployed.

In accordance with yet another preferred embodiment of the invention it is furthermore provided for that the gas bag features a variable filling volume. In this way the shape of the gas bag in the deployed condition can be further adapted to the respective situation. Should early contact between a vehicle occupant to be restrained and the gas bag occur during the deployment action, the gas bag is deployed only to a relatively small volume, whereas if the gas bag is able to deploy undisturbed it is allowed to deploy up to its defined maximum volume.

In accordance with this embodiment it may be provided for that the gas bag features tear seams which open as soon as a predetermined internal pressure of the gas bag is exceeded and permit an increase in volume of the gas bag. In this aspect the volume can be simply controlled by means of the internal pressure employed to deploy the gas bag. If the gas bag is to be maximally deployed a correspondingly high internal pressure is generated, whereas if the gas bag, as limited by the catch straps, is to be deployed only up to a relatively small volume, a reduced internal pressure appears via the gas exit ports incorporated in the wall of the gas bag, resulting in all or at least part of the tear seams remaining intact so that the maximum volume of the gas bag is available.

Advantageous aspects of the invention read from the sub-claims.

BRIEF DESCRIPTION OF THE DRAWINGS

The invention will now be described on the basis of a preferred embodiment as shown in the attached drawings. In the drawings.

DETAILED DESCRIPTION OF THE INVENTION

Figure 1:
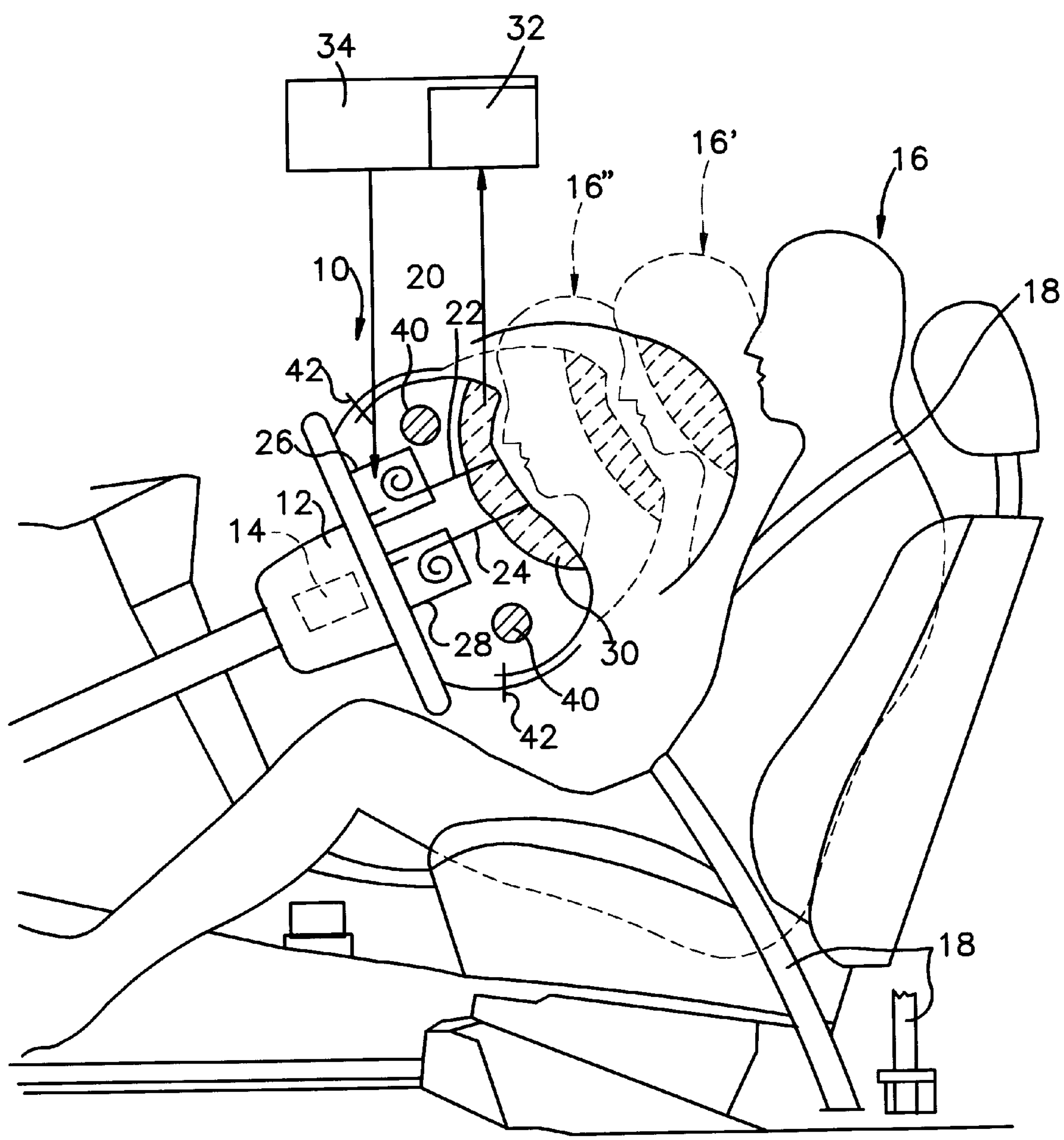
FIG. 1 shows in a schematic side view a vehicle occupant restraint system including a gas bag and mounted in a vehicle.

Referring now to FIG. 1, there is illustrated the vehicle occupant restraint system in accordance with the invention containing a gas bag 10 which in this case is employed on the driver side. Of course, it could be used just as well as the gas bag for the front seat passenger. The gas bag 10 is affixed to a steering wheel 12 which incorporates an inflator 14 which, when activated, produces a compressed gas with which the gas bag 10 can be transposed from a space-saving, folded resting condition into a deployed condition as evident from the FIG. 1. In the deployed condition the gas bag 10 serves to restrain a vehicle occupant 16 buckled up by a seat belt system 18 in the case of a high vehicle deceleration.

The gas bag 10 comprises a wall 20 as well as two catch straps 22, 24 arranged in the interior of the gas bag 10. The catch straps 22, 24 are connected to the inner side of the wall 20 on the side of the gas bag 10 facing the vehicle occupant 16. At their opposite end the catch straps 22, 24 are wound on coiling devices 26, 28 indicated schematically. The coiling devices 26, 28 are likewise arranged in the interior of the steering wheel 12 at least then, when the gas bag is located space-savingly folded in the interior of the steering wheel. The coiling devices 26, 28 take up in the resting condition a substantial portion of the length of the catch straps 22, 24 and are provided with a blocking device by means of which uncoiling of the catch straps 22, 24 can be blocked. The configuration of the coiling devices 26, 28 is similar in principle to that of conventional belt retractors used in providing the vehicle occupant with seat belt webbing.

The wall 20 of the gas bag 10 is provided on its side facing the vehicle occupant 16 with a contact surface area 30 capable of sensing impingement of parts of the body of the vehicle occupant 16, this being achieved by means of an analyzer circuit 32 which together with the contact surface area 30 and an activating circuit 34 forms a sensor. The activating circuit 34 is connected to the blocking devices of the coiling devices 26, 28. A contact film may serve as a contact surface area as is used also for actuating a signal horn, or a piezoelectric or capacitive contact surface area.

The gas bag 10 is furthermore provided with relief ports 40. These gas exit ports serve to permit escape of the compressed gas contained within the gas bag 10 to the atmosphere once a predetermined internal pressure in the interior of the gas bag 10 is exceeded. Furthermore provided in the gas bag 10 are several tear seams 42 which together with the variable length of the catch straps endow the gas bag 10 with a variable volume. As long as the tear seams 42 are intact, the internal volume of the gas bag is limited to a first relatively small value. Due to a predetermined internal pressure in the gas bag 10 being exceeded, the tear seams are able to be torn gradually, resulting in an increase in volume of the gas bag since its wall is now able to expand more. Once all tear seams are torn, the gas bag 10 features a volume having a second maximum value.

The functioning of the gas bag described hitherto will now be described. When an activating circuit (not shown in the drawings) finds out that the gas bag needs to be activated, the inflator 14 is activated. This generates a compressed gas which is introduced into the interior of the gas bag 10. The gas bag begins to deploy, the catch straps 22, 24 being withdrawn from the coiling devices 26, 28. As soon as the contact surface area 30 comes into contact with a vehicle occupant unfavorably seated in a position 16", the circuits 32, 34 send a signal to the coiling devices 26, 28 which blocks further withdrawal of the catch straps 22, 24. This blocking action may occur, for example, mechanically, electrically or also pyrotechnically. In this way the length of the catch straps 22, 24 is limited to a relatively small value and the wall of the gas bag is unable to move further toward the vehicle occupant, resulting in the impingement energy being diminished to such an extent that the risk of injury is a minimum at the most. The excess flow of the compressed gas furnished by the inflator 14 which is superfluous in the case of this relatively small volume of the gas bag 10 is discharged via the relief ports 40.

To reliably prevent the vehicle occupant from coming into contact with any hard function part located within the steering wheel or with the windshield, the sensor 30, 32, 34 outputs the signal for blocking withdrawal of the catch straps 22, 24 from the coiling devices 26, 28 not before a certain minimum length of the catch straps 22, 24 has been attained. In this way the gas bag is in any case deployed up to a defined minimum design volume with which a minimum restraining effect is assured under all circumstances for the vehicle occupant.

Should the vehicle occupant not be in the position 16" but disposed slightly bent forward in the position 16' or even properly seated fully upright, the contact of the vehicle occupant with the contact surface area 30 occurs very much later. In this case the sensor 30, 32, 34 permits a greater length or even maximum length of the catch straps 22, 24 to be attained. At the same time the tear seams 42 enable the gas bag to deploy to its maximum internal volume.

Figure 2:
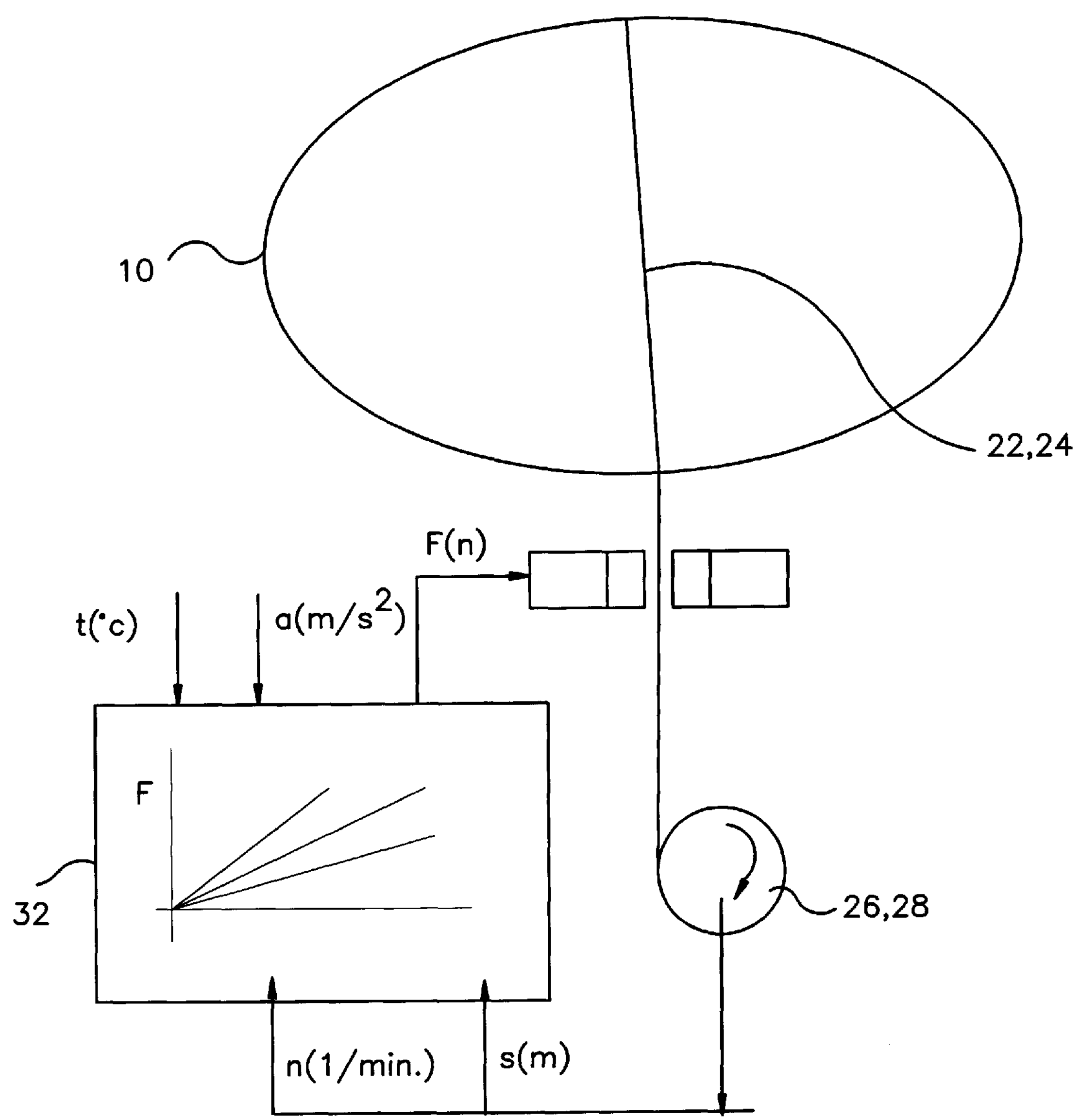
FIG. 2 shows a diagram of actuation of the restraint means provided in the restraint system of the invention.

FIG. 2 shows in a diagram various parameters which can be fed to analyzer circuit 32 in order to determine if the coiling devices 26, 28 need to prevent further withdrawal of the catch straps 22, 24. Such parameters are in particular the outside temperature T which influences the efficiency of the inflator 14 and thereby the amount of pressurized gas provided. Further, the vehicle deceleration a might be taken into account since severity of the vehicle collision is important for the volume of the gas bag which needs to be attained at the minimum in order to prevent the vehicle occupant from completely penetrating the gas bag. Still further, the speed of rotation n of the coiling devices in combination with the length s of the catch straps already withdrawn from the coiling devices allow to gather important information on the deployment of the gas bag. On the basis of these parameters, the braking force F provided by the restraint means can be determined so that controlled deceleration of those wall portions of the gas bag facing the vehicle occupant is achieved.

What is claimed is:

1. A vehicle occupant restraint system, including a gas bag transposable from a space saving, folded resting condition into a deployed condition, a restraint means capable of decelerating at least part of the wall of said gas bag in a controlled manner, said restraint means containing at least one coiling device arranged in the interior of a steering wheel, and at least one catch strap arranged in the interior of said gas bag and influencing the shape of said gas bag in said deployed condition, said catch strap being at least in part accommodated on said restraint means when said gas bag is in said resting condition.

2. The vehicle occupant restraint system of claim 1, wherein said gas bag is provided with at least one relief port enabling a discharge of compressed gas from the internal volume of said gas bag.

* * * * *